No. 744,591. PATENTED NOV. 17, 1903.
S. S. MOORE.
SADDLE.
APPLICATION FILED FEB. 18, 1903.
NO MODEL.
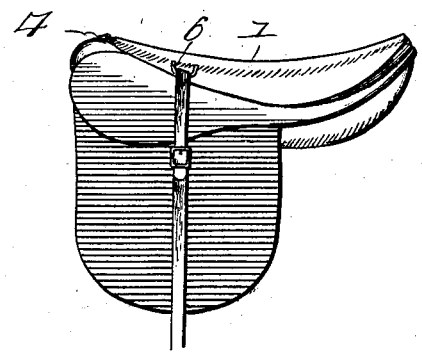
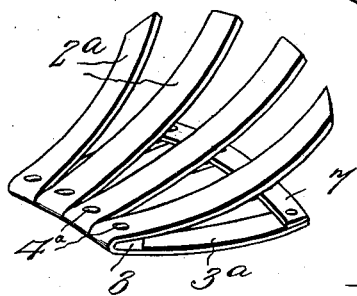
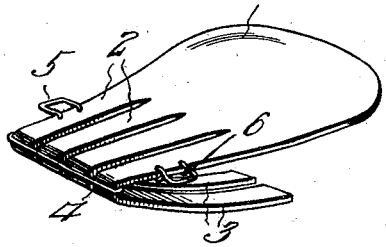
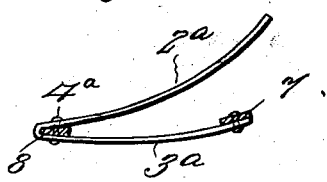
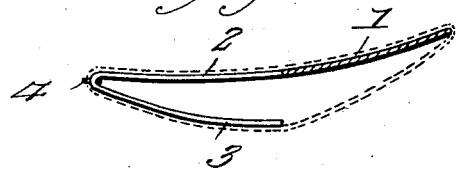
Witnesses
Inventor
Sidney S. Moore,
By Victor J. Evans
Attorney No. 744,591. Patented November 17, 1903.

UNITED STATES PATENT OFFICE.

SIDNEY S. MOORE, OF CROCKETT, TEXAS.

SADDLE.

SPECIFICATION forming part of Letters Patent No. 744,591, dated November 17, 1903.

Application filed February 18, 1903. Serial No. 143,900. (No model.)

*To all whom it may concern:*

Be it known that I, SIDNEY S. MOORE, a citizen of the United States, residing at Crockett, in the county of Houston and State of Texas, have invented new and useful Improvements in Saddles, of which the following is a specification.

This invention relates to saddles, but more particularly to a spring, frame, or tree upon which the saddle is to be fashioned.

One of the principal objects of the invention is to provide an inexpensive, durable, and efficient frame or tree possessing strength and resiliency, so that a cushion-seat will be provided for the rider.

Other objects, as well as the novel construction, will be specifically described hereinafter and illustrated in the accompanying drawings, in which—

Figure 1 is a side elevation of a saddle complete. Fig. 2 is a perspective view of the frame or tree. Fig. 3 is a vertical longitudinal sectional view through the tree. Fig. 4 is a perspective view of a modified form of tree. Fig. 5 is a vertical longitudinal sectional view through the same.

The tree or frame is preferably constructed of sheet metal, and the seat 1 from a point about midway the length of the saddle toward the cantle will preferably be solid, and projecting forwardly toward the pommel are a plurality of parallel-disposed fingers 2, which are bent back upon themselves to form spring supports or extensions 3, projecting beneath the seat and terminating about midway the distance between the pommel and cantle. The forward extremities of the several fingers are secured together by a suitable fastening device 4, which may comprise a wire tie, as shown in Fig. 2, or a fastening device similar to that shown in Figs. 4 and 5. Oppositely-disposed loops 5 and 6 project from the outside fingers and extend through the fabric constituting the covering for the saddle, so that the stirrup-straps can be secured thereto in a convenient manner.

By forming the fingers as shown in Figs. 2 and 3 the entire seat will be fulcrumed at the foremost extremity thereof and the cantle will be free to move vertically, so as to provide a cushion-seat for the rider. Of course the concave side of the saddle, or the portion thereof which fits over the back of the animal, will be padded in the usual manner.

In Figs. 4 and 5 I have illustrated a modified form in which the fingers $3^a$ are connected at their rear extremities by a transverse and curved connecting-bar 7. The fingers $3^a$ extend forward toward the pommel of the saddle and are then bent back upon themselves to form rearwardly and upwardly curved extensions $2^a$, which project beyond the connecting-bar 7, each extension being successively longer than the preceding one from the sides toward the center, so that the proper curve or shape can be given to the cantle of the saddle. The forward portions of the fingers are secured together by a securing-strip 8, which rests within the bent portions thereof. This strip comprises a securing device, which extends transversely of the tree to add rigidity to the structure. The strip is curved to conform to the shape of the saddle and fastened to the respective fingers by means of rivets or bolts, which extend through the upper portions of the fingers and through the strips. The two securing-strips 7 and 8 impart a sufficient amount of rigidity to the lower portion of the tree, permitting the upper extensions of the fingers to have free play, whereby the seat will be fulcrumed at or adjacent to the pommel, leaving the cantle free to move vertically and receive the vibrations caused by the weight of the rider on the animal.

It will be noticed in both forms of the device the ends of one set of fingers are free to move independently of each other, while their remaining ends are secured together. The object of this arrangement is to provide a sufficient amount of rigidity to the tree and at the same time provide for an independent spring action on any part of the saddle, so that the seat will practically conform to the position of the rider on the saddle. Of course the form shown in Figs. 4 and 5 will be provided with suitable pads and covering according to the style of saddle to be made.

The same style of frame will be used for practically all styles of saddles; but the particular form will be modified to accommodate the peculiar form of saddle to be made. I therefore reserve the right to make such slight changes and alterations as will properly suggest themselves within the scope of the accompanying claims.

Having thus described my invention, what I claim, and desire to secure by Letters Patent, is—

1. A saddle-tree comprising a plurality of spring-fingers bent back upon themselves, and a fastening device engaging the folds made by bending the fingers, the said fingers at one end being free to move independently and disposed at an angle of inclination to the remaining part of the tree.

2. A saddle-tree comprising a plurality of flat spring-fingers which are bent and partially projected in a rearward direction, and a fastening device engaging the bends of the fingers to hold them in positive relation.

3. A saddle-tree comprising a plurality of strips bent back upon themselves to form spring-fingers, a fastening-strip resting within the fold made by bending the strips, means for securing the fastening-strip to the fingers, the upper extremities of which are free to move independently, and means for connecting the ends of the remaining portions of the fingers.

In testimony whereof I affix my signature in presence of two witnesses.

SIDNEY S. MOORE.

Witnesses:
F. H. BAYNE,
CHAS. LONG.